(No Model.)
J. HOBBS.
APPARATUS FOR MAKING INFUSIONS.
No. 370,141. Patented Sept. 20, 1887.
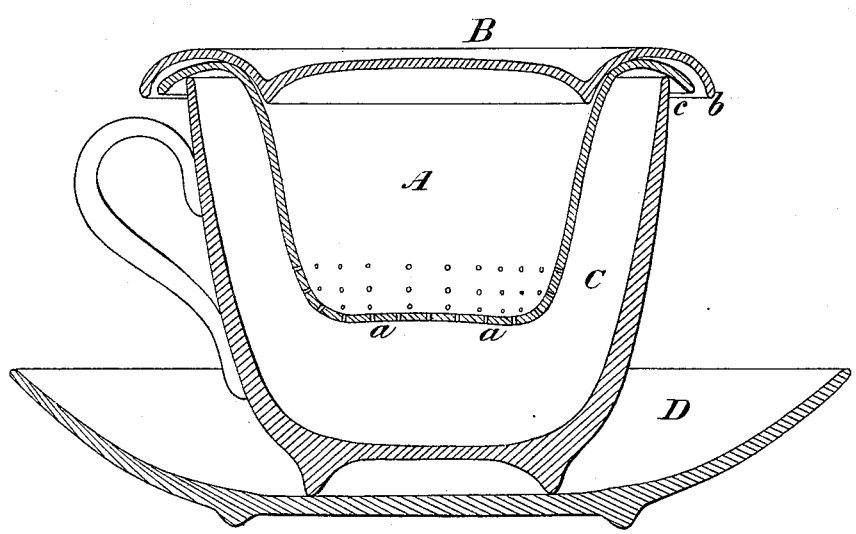
Witnesses
James M. Tully.
John P. Hunt Jr.
Inventor
James Hobbs.
by George Haseltine Attorney

UNITED STATES PATENT OFFICE.

JAMES HOBBS, OF BRIGHTON, ENGLAND.

APPARATUS FOR MAKING INFUSIONS.

SPECIFICATION forming part of Letters Patent No. 370,141, dated September 20, 1887.

Application filed July 10, 1886. Serial No. 207,640. (No model.) Patented in England June 2, 1885, No. 6,672.

*To all whom it may concern:*

Be it known that I, JAMES HOBBS, a subject of the Queen of Great Britain, and residing at Brighton, England, have invented a new and useful Improved Apparatus for Making Infusions in Small Quantities, more especially for making tea, (for which I have obtained a patent in Great Britain, No. 6,672, bearing date June 2, 1885,) of which the following is a specification.

This invention is represented in the accompanying drawing.

The drawing shows a tea-cup and this improved device in sectional elevation.

A is the body or main portion of the infuser, and B is the lid therefor, which lid is also capable of serving as a saucer or stand for the vessel A. The top of A is curved at c, so as to support the whole in a cup or similar vessel, and the upper surface is of such a shape that it will touch the inner curve, b, of the lid B, and prevent escape of the aroma of the infusion and will prevent access of the atmospheric air, thus retarding the cooling of the contents. The contour of the two curves should be such that they touch one another at a point within and below the highest point of the curved part b of the vessel A. In the bottom of A there are perforations a, or slits, which should be too fine to allow the tea-leaves to pass through.

C is an ordinary breakfast or tea cup; D, the saucer therefor.

In using the apparatus or invention the vessel A is placed in any ordinary breakfast or tea cup, C, its shape adapting it to fit any ordinary cup. The tea or other substance is placed within the vessel A, and water is poured upon the same until the infusion apparatus and cup are filled to the desired extent; or the water may be put in first and the tea afterward. The lid B is then placed on, as shown in the drawing. When the tea has "drawn," or the infusing process has continued long enough, the lid B is taken off and inverted and then serves as a saucer or stand for the vessel A, which is then lifted from the cup, leaving the clear infusion behind.

Having described my invention, what I claim, and desire to secure by Letters Patent, is—

An infusing apparatus consisting of the vessel A, having the holes or apertures a, and the curved portion c, (corresponding with the curved portion b of the lid B,) combined with the lid B, having the curved portion b, (corresponding with the curved part c of the vessel A,) all as described, and represented in the accompanying drawing.

In witness whereof I have hereto set my hand in the presence of two subscribing witnesses.

JAMES HOBBS.

Witnesses:
  NEWNHAM BROWNE,
*Patent Agent, 73 Cheapside, London.*
  HERBERT E. DALE,
*Notary's Clerk, 17 Gracechurch Street, London, E. C.*